(12) United States Patent
Scharlemann et al.

(10) Patent No.: US 9,944,559 B2
(45) Date of Patent: Apr. 17, 2018

(54) CELLULOSE ETHER AND MICROCRYSTALLINE CELLULOSE IN INORGANIC BINDER COMPOSITIONS

(75) Inventors: Sonja Scharlemann, Wedemark (DE); Joerg Neubauer, Hamburg (DE); Matthias Knarr, Nienburg/Weser (DE)

(73) Assignee: Dow Global Technologies LLC, Midland, MI (US)

( * ) Notice: Subject to any disclaimer, the term of this patent is extended or adjusted under 35 U.S.C. 154(b) by 892 days.

(21) Appl. No.: 13/697,981

(22) PCT Filed: Jun. 23, 2011

(86) PCT No.: PCT/US2011/041558
§ 371 (c)(1), (2), (4) Date: Nov. 14, 2012

(87) PCT Pub. No.: WO2012/005960
PCT Pub. Date: Jan. 12, 2012

(65) Prior Publication Data
US 2013/0092056 A1    Apr. 18, 2013

Related U.S. Application Data

(60) Provisional application No. 61/359,381, filed on Jun. 29, 2010.

(51) Int. Cl.
| | |
|---|---|
| *C04B 24/38* | (2006.01) |
| *C04B 24/10* | (2006.01) |
| *C04B 28/04* | (2006.01) |
| *C04B 28/14* | (2006.01) |
| *C04B 40/00* | (2006.01) |
| *C04B 111/00* | (2006.01) |
| *C04B 111/20* | (2006.01) |
| *C04B 111/70* | (2006.01) |

(52) U.S. Cl.
CPC .............. *C04B 24/10* (2013.01); *C04B 28/04* (2013.01); *C04B 28/14* (2013.01); *C04B 40/0042* (2013.01); C04B 2111/00146 (2013.01); C04B 2111/00482 (2013.01); C04B 2111/00637 (2013.01); C04B 2111/00672 (2013.01); C04B 2111/29 (2013.01); C04B 2111/70 (2013.01); Y02W 30/97 (2015.05)

(58) Field of Classification Search
CPC ... C04B 24/383; C04B 28/04; C04B 40/0042; C04B 2103/0057; C04B 40/0608; C04B 2111/00146; C04B 2111/00482; C04B 2111/00637; C04B 2111/00672; C04B 2111/29; C04B 2111/70; C04B 22/00; C04B 24/10
See application file for complete search history.

(56) References Cited

U.S. PATENT DOCUMENTS

| | | | |
|---|---|---|---|
| 5,767,176 A | 6/1998 | Nakanishi et al. | |
| 6,593,468 B1 | 7/2003 | Lange et al. | |
| 2004/0055512 A1 | 3/2004 | Nagler, Jr. | |
| 2005/0241539 A1* | 11/2005 | Hagen et al. | 106/805 |

FOREIGN PATENT DOCUMENTS

| | | |
|---|---|---|
| DE | 19746264 | 4/1999 |
| EP | 0125226 | 11/1984 |
| FR | 2904826 | 2/2008 |
| JP | 08067542 A | 3/1996 |
| JP | 08151504 A | 6/1996 |
| JP | 2007112664 A | 5/2007 |
| WO | 199502966 | 2/1995 |
| WO | 2004022601 | 3/2004 |
| WO | 2008122345 | 10/2008 |

OTHER PUBLICATIONS

Fu, Xuli; Chung, D.D.L. "Effect of Methylcellulose admixture on the mechanical properties of cement". Cement and Concrete Research. vol. 26. No. 4, pp. 535-538. 1996. Retrieved from http://wings.buffalo.edu/academic/department/eng/mae/cmrl/Effect%20of%20methycellulose%20admixture%20on%20the%20mechanical%20properties%20of%20cement.pdf.*

* cited by examiner

*Primary Examiner* — Kaj K Olsen
(74) *Attorney, Agent, or Firm* — Andrew E. Merriam; Steven W. Mork

(57) ABSTRACT

A new water-based inorganic binder composition includes inorganic binder, cellulose ether and microcrystalline cellulose. A new additive for water-based inorganic binder compositions includes cellulose ether and microcrystalline cellulose. A method for improving the properties of water-based inorganic binder compositions includes blending a combination of cellulose ether and microcrystalline cellulose in the water-based binder composition.

6 Claims, No Drawings

CELLULOSE ETHER AND MICROCRYSTALLINE CELLULOSE IN INORGANIC BINDER COMPOSITIONS

CROSS REFERENCE STATEMENT

This application claims the benefit of U.S. Provisional Application No. 61/359,381, filed Jun. 29, 2010, the entire content of which is incorporated herein by reference.

BACKGROUND OF THE INVENTION

Field of the Invention

The present invention relates to inorganic binder compositions as well as an additive package for and a method of improving properties of inorganic binder compositions.

Description of Related Art

Water-based inorganic binder compositions include gypsum-based joint mortar compositions, gypsum-based spray mortars and cement-based tile adhesives. These compositions require working by hand during their application, making labor costs a significant part of their application. Moreover, these compositions perform a visible function in a building structure so ease in workability as well as their performance properties are critical to achieving an aesthetically pleasing finish in an efficient manner. Therefore, it is desirable to improve the workability and final properties of water-based inorganic binder compositions to increase the speed and/or ease of their application and improve their final properties in order to lower costs while improving results.

WO2008/122345 discloses use of highly substituted specialty hydroxy cellulose ether, methyl hydroxypropyl cellulose, as an additive in gypsum-bound building material systems to improve processability and in particular lump formation. While this reference discloses an improvement to the workability of gypsum-based systems, the method requires synthesis and mill drying of the special methylhydroxypropyl cellulose, a complex process that makes the additive expensive.

It is desirable to improve workability and/or final properties of water-based inorganic binder compositions without requiring methylhydroxypropyl cellulose. It is also desirable to find a universal way to improve compositions beyond just gypsum-based systems.

BRIEF SUMMARY OF THE INVENTION

Surprisingly, water-based inorganic binder compositions comprising cellulose ether in combination with microcrystalline cellulose demonstrates improved workability and/or final properties. In particular, including both cellulose ether and microcrystalline cellulose surprisingly offers the following benefits: (a) in gypsum-based joint mortar compositions there is a reduction in lump formation; (b) in gypsum spray plaster there is an increase in workability, particularly leveling; and (c) in cement-based tile adhesive there is an increased freeze-thaw resistance. The combination of cellulose ether and microcrystalline cellulose offers improvements to a breadth of water-based inorganic binder compositions including gypsum-based systems and cement-based systems.

In a first aspect, the present invention is a water-based inorganic binder composition comprising inorganic binder, cellulose ether and microcrystalline cellulose. Desirable embodiments of the first aspect can include any one or any combination of more than one of the following features: the inorganic binder is selected from a group consisting of gypsum-based mortar and cement; the microcrystalline cellulose is present at a concentration of 10-30 percent by weight based on total weight of cellulose ether and microcrystalline cellulose; the combined concentration of cellulose ether and microcrystalline cellulose is in a range of 0.01 to 1.0 weight-percent based on total dry weight of the water-based inorganic binder composition; further comprises water; the microcrystalline cellulose is free of agglomerated additive materials; and the composition is free of methyl hydroxypropyl cellulose.

In a second aspect, the present invention is an additive package for water-based inorganic binder compositions, the additive package comprising cellulose ether and microcrystalline cellulose. Desirable embodiments of the second aspect can further comprise one or any combination of more than one of the following features: the concentration of microcrystalline cellulose is present at a concentration of 10-30 percent by weight based on total weight of cellulose ether and microcrystalline cellulose; the microcrystalline cellulose is free of agglomerated additive materials; and the composition is free of methyl hydroxypropyl cellulose.

In a third aspect, the present invention is a method for improving the properties of water-based inorganic binder compositions, the process comprising blending a combination of cellulose ether and microcrystalline cellulose in the water-based binder composition. Desirable embodiments of the third aspect can have any one or any combination of more than one of the following features: the concentration of microcrystalline cellulose is present at a concentration of 10-30 percent by weight based on total weight of cellulose ether and microcrystalline cellulose; the combined concentration of cellulose ether and microcrystalline cellulose being in a range of 0.01 to 0.1 weight-percent based on total dry weight of the water-based inorganic binder composition; the microcrystalline cellulose is free of agglomerated additive materials.

The binder composition of the present invention is useful as a building and construction material. The additive package of the present invention is useful for preparing the binder composition of the present invention. The method of the present invention is useful for improving properties of water-based inorganic binder compositions and for preparing the binder composition of the present invention.

DETAILED DESCRIPTION OF THE INVENTION

Test methods refer to the most recent test method as of the priority date of this document unless the test method number includes a different date. References to test methods contain both a reference to the testing society and the test method number. The following test method abbreviations apply herein: ASTM refers to American Society for Testing and Materials; EN refers to European Norm; DIN refers to Deutsches Institute für Normung; and ISO refers to International Organization for Standards.

"Multiple" means two or more. "And/or" means "and, or as an alternative". All ranges include endpoints unless otherwise indicated. "Comp Ex" and "Comparative Example" are interchangeable as are "Example" and "Ex".

The present invention relates to water-based inorganic binder compositions. "Water-based" means that water is part of the composition during application of the composition. A "water-based" composition can be free of water prior to use. For example, water-based inorganic binder compositions are often marketed and stored as dry powders that are mixed with water just prior to application and use. "Inorganic binders" are materials that comprise an inorganic material that bonds together in some way subsequent to application. Examples of water-based inorganic binder compositions include gypsum compositions such as gypsum mortars including joint mortars and spray plaster as well as cement compositions such as cement tile adhesive. Other inorganic binder compositions include lime, cement based adhesives, reinforcement mortar for external thermal insulation composition systems, cement based grouts, and cement based renders for both manual and machine application.

The water-based inorganic binder composition comprises cellulose ether ("CE"). The CE can be a single type of CE or a combination of more than one type of CE. Suitable CE include any one or combination of more than one of the following: $C_1$-$C_3$ alkyl cellulose ethers (such as methyl cellulose ethers); $C_1$-$C_3$ alkyl hydroxy-$C_1$-$C_3$ alkyl cellulose ethers (such as methyl hydroxyethyl cellulose ethers, methyl hydroxy propyl cellulose ethers and ethyl hydroxyethyl cellulose ethers); hydroxy $C_1$-$C_3$ alkyl cellulose ethers (such as hydroxyethyl cellulose ethers and hydroxypropyl cellulose ethers); mixed hydroxy $C_1$-$C_3$ alkyl cellulose ethers (such as hydroxyethyl hydroxypropyl cellulose ethers); carboxy $C_1$-$C_3$ alkyl cellulose ethers (such as carboxymethyl cellulose ethers); carboxy $C_1$-$C_3$ alkyl hydroxy $C_1$-$C_3$ alkyl cellulose ethers (such as carboxymethyl hydroxyethyl cellulose ethers); and alkoxy hydroxypropyl hydroxyethyl cellulose ethers where the alkoxy group is straight-chain or branched and contains 2 to 8 carbon atoms. Particularly desirable CEs for use in the present invention include methylcellulose ether, hydroxyl ethyl cellulose ether, hydroxypropyl methyl cellulose (HPMC), hydroxylethyl methyl cellulose (HEMC), ethylhydroxyl ethyl cellulose (EHEC), and methylethylhydroxyethyl cellulose (MEHEC). Herein, $C_1$—$_3$ alkyl refers to an alkyl chain containing from one to three carbons.

The water-based inorganic binder composition further comprises microcrystalline cellulose ("MCC"). MCC is purified, partially depolymerized cellulose. Naturally occurring cellulose contains both crystalline and amorphous regions. In contrast MCC corresponds to isolated crystalline portions of cellulose without the amorphous regions. Isolation of MCC from naturally occurring cellulose typically involves removing amorphous regions of a purified cellulose material by hydrolytic degradation using a strong acid. MCC typically exists as particulate aggregates, sometimes called "crystallites", having an average particle size in a range of one to 400 microns and more commonly an average particle size in a range of ten to 250 microns.

The pharmaceutical industry enjoys use of MCC in manufacturing tablets, where MCC serves as a filler material that has desirable compressive properties beneficial in compressed tablets. MCC is also commonly used in food compositions such as salad dressings. Teachings on industrial applications of MCC are few.

WO 2004/022601 discloses particulate agglomerate compositions of MCC co-processed with additive materials. MCC serves as a carrier material for the additive in these compositions. The particulate agglomerate compositions comprise MCC in intimate association with the additive material. The additive of primary interest is silicon dioxide, used to form "silicified microcrystalline cellulose". The reference lists the following industrial applications for the particulate agglomerate compositions: pigments, cosmetics and sunscreen, insulating additives for wire and cable, ceramic for insulators and computers, spark plugs, colored paper, pet foods and animal feed to supply, silica, color, minerals, etc., paint, adhesives, polishing compounds, electroplating, carbon black in cement and mortar to prevent color leaching and carbon black floating, catalytic converters and electronic adhesives.

The present invention relates to a new industrial application of MCC. The present invention benefits from a surprising discovery that formulating water-based inorganic binder compositions with a combination of CE and MCC results in improved performance characteristics over similar compositions formulated with only CE. It is common in the industry to formulate water-based inorganic binder compositions with CE for the purpose of increasing water retention and thickness of the binder composition. Surprisingly, replacing a portion of the CE with MCC can improve workability and/or performance of a water-based inorganic binder composition. Improvements include increased freeze-thaw stability according to EN1348, decreased lumping upon hydrating powdered water-based inorganic binder compositions and improved workability of water-based inorganic binder compositions during application. Unlike the applications in WO2004/022601, the MCC can be free of agglomerated additive materials. Unlike WO2008/122345, the present invention can be free of methylhydroxypropyl cellulose and still experience benefits, such as a decrease in lumping, due to the presence of MCC.

Improvements can be evident with MCC concentrations of 10 weight-percent (wt %) or more, preferably 15 wt % or more based on total combined weight of MCC and CE. At the same time, the concentration of MCC is generally 40 wt % or less, preferably 30 wt % or less and most preferably 20 wt % or less based on total combined weight of MCC and CE. Generally, little if any improvement is observed when the concentration of MCC is less than 10 wt % based on MCC and CE combined weight. At concentrations exceeding 40 wt % based on MCC and CE combined weight, little additional improvement is observed, detrimental affects to other properties of the water-based inorganic binder composition can be observed and the cost becomes unnecessarily high.

In a typical water-based inorganic binder composition, the concentration of MCC and CE combined is 0.01 wt % or more, preferably 0.05 wt % or more based on total dry weight of the water-based inorganic binder composition. At the same time, the concentration of MCC and CE combined is typically 1.0 wt % or less and preferably 0.5 wt % or less based on total dry weight of the water-based inorganic binder composition.

In one aspect, the present invention is a water-based inorganic binder composition that comprises MCC and CE and that can comprise other additives. The water-based inorganic binder composition can be in a dry powder form or in a hydrated form.

One embodiment of the present invention is a water-based cement composition comprising MCC and CE. Cement compositions comprise cement, MCC and CE. Desirably cements include original Portland cement (OPC) including OPC classes of CEM I, CEM II, and CEM III with hardening classes of 32.5R, 42.5R, and 52.5R. Water-based cement compositions can further comprise additives such as redispersible polymer powders, cellulose fibers, starch ether, polyacrylamide, retarders such as tri-sodium citrate dehydrate, dispersants, accelerators such as calcium formiate, fibers, sand, and hydrated lime.

Another embodiment of the present invention is a water-based gypsum composition. Water-based gypsum compositions comprise a gypsum mortar such as natural gypsum, synthetic gypsum, anhydrate, multiphase gypsum, or hemihydrate gypsum. In one form of this embodiment the invention is a mortar composition commonly used as joint filler. In another form of this embodiment the invention is a water-based gypsum spray plaster. The water-based gypsum composition can further comprise one or any combination of more than one additive including starch ether, polyacrylamide, redispersible polymer powers, accelerators such as dihydrate, retardation agents such as tartaric acid, lightweight aggregates like perlite, and air-entraining agents such as sodium lauryl sulfate.

In another aspect, the present invention is an additive package for water-based inorganic binder compositions, the additive package comprising MCC and CE. The concentration of MCC relative to CE is desirably as described above. Blending the additive package with a water-based inorganic binder produces the water-based inorganic binder composition of the present invention. Generally, blending of the additive package with the water-based inorganic binder occurs in a dry powder state. The water-based inorganic binder, and resulting inorganic binder composition, can further comprise additional additives including any of those already mentioned. Typical additives include powders, fibers, redispersible polymer powders, cellulose, polyacrylamide, starch ether, retardation agents such as tri-sodium citrate dehydrate or tartaric acid, accelerators such as calcium formiate or dihydrate, lightweight aggregates like perlite, and air-entraining agents such as sodium laurylsulfate.

In yet another aspect, the present invention is a method for improving the properties of water-based inorganic binder composition comprising the step of blending a combination of CE and MCC in the water-based binder composition. The CE and MCC are as described above, as is the water-based inorganic binder composition. Generally, blending of the additive package with the water-based inorganic binder occurs in a dry powder state, which allows realization of the benefits such as a decrease in lumping during hydration.

The following examples serve to illustrate embodiments of the present invention.

Comparative Example A and Examples 1-3:
Standard Cement-Based Tile Adhesive

For Comparative Example A, prepare a dry cement composition consisting of CEM I 42.5 R cement (40 wt % based on total dry cement composition; available from Holcim), Quarzsand F32 (rough) sand (58.5 wt % based on total dry cement composition; available from Quarzwerke GmbH) and DLP 212 redispersible polymer powder (1.5 wt % based on total dry cement composition; available from Dow Wolff Cellulosics). Dry blend the dry cement composition with 0.3 wt % based on total blend weight of high viscosity hydroxyethyl methyl cellulose (characteristics are: DS 1.39 and MS 0.19; viscosity of 46800 millipascals*second (mPa*s) in a 2 wt % aqueous solution at 20° C.; Roovisko, D-2.55 s-1; 45-46% is retain by 63 micron mesh). Hydrate the resulting water-based inorganic binder composition with water while mixing to form a hydrated binder composition having a water-to-solid weight ratio of 0.19.

For Example 1, prepare a hydrated binder composition in like manner as Comparative Example A except use an additive package comprising nine weight-parts of the high viscosity hydroxyethyl methyl cellulose and one weight-part MCC (for example, MICROCEL™ microcrystalline cellulose where 0.4% is retained by 250 micron mesh and 55.7% is retained by 74 micron mesh; MICROCEL is a trademark of Blanver Farmoquimica LTDA) in place of the hydroxyethyl methyl cellulose.

For Example 2, prepare a hydrated binder in like manner as Example 1 except use an additive package comprising eight weight-parts of the hydroxyethyl methyl cellulose and two weight-parts of the microcrystalline cellulose.

For Example 3, prepare a hydrated binder in like manner as Example 1 except use an additive package comprising seven weight-parts of the hydroxyethyl methyl cellulose and three weight-parts of the microcrystalline cellulose.

Characterize the performance of Comparative Example A and Examples 1-3 according to standard test methods EN 1308 (Slip Resistance), EN 1348 (Freeze-Thaw Stability) and EN1346 (Open Time). See Table 1 for results wherein "N/mm$^2$" means "Newtons per square millimeter" and "mm" means "millimeters".

TABLE 1

| Property | Comp Ex A | Ex 1 | Ex 2 | Ex 3 | Units |
| --- | --- | --- | --- | --- | --- |
| Freeze-Thaw Stability | 0.11 | 0.65 | 0.63 | 0.60 | N/mm$^2$ |
| Slip Resistance (distance after 20 min) | 1.4 | 1.3 | 1.2 | 1.2 | mm |
| Open Time (20 min) | 0.75 | 0.74 | 0.78 | 0.63 | N/mm$^2$ |

Examples 1-3 demonstrate over a 5-fold improvement in Freeze-Thaw Stability over Comparative Example A as a result of including MCC in the composition. At the same time, Examples 1-3 demonstrate comparable properties in 20 minute Slip Resistance and 20 minute Open Time as Comparative Example A. Hence, Comparative Example A and Examples 1-3 illustrate improvement in Freeze-Thaw Stability while maintaining other key properties for a standard quality cement tile adhesive upon formulating the adhesive with a combination of CE and MCC.

Comparative Example B and Examples 4 and 5:
Premium Cement-Based Tile Adhesive

For Comparative Example B and Examples 4 and 5 blend a dry cement composition with an additive package as described in Table 2.

The dry cement composition consists of CEM I 52.5 R cement (35.0 wt % based on total dry cement composition; available from Milke), Quarzsand F32 (rough) sand (31.6 wt % based on total dry cement composition; available from Quarzwerke GmbH), Quarzsand F36 (fine) sand (31.0 wt % based on total dry cement composition; available from Quarzwerke GmbH), DLP 212 redispersible polymer powder (2.0 wt % based on total dry cement composition; available from Dow Wolff Cellulosics), and Arbocel™ BWW 40 cellulose fiber additive (0.4 wt % based on total dry cement composition; Arbocel is a trademark of J. Rettenmaier & Soehne GmbH & Co).

Dry blend the dry cement composition with 0.45 wt % of the corresponding additive package from Table 2, values are in wt % based on total additive package:

TABLE 2

| | | Example | |
|---|---|---|---|
| Additive Component | Comp Ex B | 4 | 5 |
| Cellulose Ether[1] | 74 | 62.9 | 59.2 |
| Starch Ether[2] | 20 | 20 | 20 |
| Polyacrylamide[3] | 6 | 6 | 6 |
| Microcrystalline Cellulose[4] | 0 | 11.1 | 14.8 |

[1]Methyl hydroxypropyl cellulose with a DS 1.55 and MS 0.18; viscosity of 13400 mPa*s (2 wt % aqueous solution at 20° C.; Rotovisko, D-2.55 s-1); 30-50% retained by 63 micron mesh.
[2]Cold water soluble starch ether based on corn starch and having a viscosity of 1200-1600 mPa*s (5% aqueous solution, Brookfield spindle 3.50 rpm)
[3]A medium anionic with viscosity of approximately 4000 mPa*s 0.5% distilled water solution) and 65-85% is retained by 3 micron mesh.
[4]MICROCEL™ microcrystalline cellulose where 0.4% is retained by 250 micron mesh and 55.7% is retained by 74 micron mesh; MICROCEL is a trademark of Blanver Farmoquimica LTDA.

Hydrate the resulting water-based inorganic binder composition with water while mixing to form a hydrated binder composition having a water-to-solid weight ratio of 0.28.

Characterize the performance of Comparative Example B and Examples 4 and 5 according to standard test methods EN 1308 (Slip Resistance), EN 1348 (Freeze-Thaw Stability) and EN1346 (Open Time). See Table 3 for results wherein "N/mm$^2$" means "Newtons per square millimeter" and "mm" means "millimeters".

TABLE 3

| Property | Comp Ex B | Ex 4 | Ex 5 | Units |
|---|---|---|---|---|
| Freeze-Thaw Stability | 0.74 | 0.84 | 0.98 | N/mm$^2$ |
| Slip Resistance (distance after 20 min) | 0.4 | 0.4 | 0.2 | mm |
| Open Time (20 min) | 1.14 | 1.1 | 0.75 | N/mm$^2$ |

Examples 4 and 5 demonstrate improved Freeze-Thaw Stability over Comparative Example B as a result of including MCC in the composition. At the same time, Examples 4 and 5 demonstrate comparable properties in 20 minute Slip Resistance and 20 minute Open Time as Comparative Example B. Hence, Comparative Example B and Examples 4 and 5 illustrate improvement in Freeze-Thaw Stability while maintaining other key properties for a premium quality cement tile adhesive upon formulating the adhesive with a combination of CE and MCC.

Comparative Example C and Examples 6 and 7:
Gypsum Mortar and Lumping

Prepare Comparative Example C and Examples 6 and 7 by blending 200 grams (g) of gypsum (Knauf Gipsspachtel, Knauf Westdeutsche Gipswerke, Germany) with 0.5 g additive package (see Table 4) in a 500 milliliter (ml) beaker, adding 100 ml water at 20° C., slowly wet the blend by folding in the water with a wooden stirrer for 15 seconds, then stir continuously with the wooden stirrer for another 45 seconds.

Evaluate the resulting formulation for lumps immediately after mixing and again after waiting 10 minutes and applying to a surface. Table 4 reports the results.

TABLE 4

| Characteristic | Comp Ex C | Example 6 | Example 7 |
|---|---|---|---|
| Additive Package | 96 wt % CE[1]<br>4 wt % polyacrylamide[2] | 86 wt % CE[1]<br>10 wt % MCC[3]<br>4 wt % polyacrylamide[2] | 76 wt % CE[1]<br>20 wt % MCC[3]<br>4 wt % polyacrylamide[2] |

TABLE 4-continued

| Characteristic | Comp Ex C | Example 6 | Example 7 |
|---|---|---|---|
| Lump Evaluation | | | |
| One Minute | small lumps | no lumps | no lumps |
| 10 Minute | small lumps | no lumps | no lumps |
| Time to Thickening Start (seconds) | 5-6 | 5 | 5 |
| Rate of Thickening[4] | 1 | 1 | 2 |
| 1 minute standing strength[4] | 1 | 1 | 1 |
| 10 minute standing strength[4] | 1 | 1 | 1 |
| Consistency per EN1015 (millimeters) | 131-134 | 131-136 | 134-135 |

[1] The cellulose ether is a methylhydroxyethyl cellulose having a DS 1.57 and MS (EO) 0.28; viscosity of 24660 mPa*3 (2% aqueous solution, 20° C., Rotovisko, D-2.55 s-1) and 77.6 percent retained by 63 micron mesh.
[2] The polyacrylamide is medium anionic having a viscosity of approximately 250 mPa*s (0.5% in 10% sodium chloride solution) and 65-85% is retained by 63 micron mesh.
[3] The microcrystalline cellulose is MICROCEL ™ microcrystalline cellulose where 0.4% is retained by 250 micron mesh and 55.7% is retained by 74 micron mesh; MICROCEL is a trademark of Blanver Farmoquimica LTDA.
[4] Evaluation ranking is on a scale of 1-5 with 1 best and 5 worst.

The data in Table 4 reveals that using a combination of MCC and CE instead of just CE in gypsum mortar results in less lumping, actually an absence of visible lumps, upon hydrating the gypsum mortar while retaining other key properties of the mortar.

Comparative Example D-F and Examples 8-10: Spray Gypsum Workability

Comparative Examples D-F compare Gypsum spray formulations that contain 0.250, 0.225 and 0.200 weight-parts of an additive package per 100 weight-parts of gypsum (Gips-MP Knauf Rottleberode), respectively. The additive package consists of 97.7 wt % cellulose ether (methylhydroxyethyl cellulose with a DS 1.56 and MS0.27; viscosity of 35590 mPa*s (2% aqueous solution, 20° C., Rotovisko, D-2.55 s-1) and 40-60% retained by 63 micron mesh) and 2.3 wt % polyacrylamide (slightly anionic with viscosity of approximately 1000 mPa*s measured in 0.5% distilled water solution).

Examples 8-10 compare formulations containing 0.250 weight-parts of an additive package identical to that of Comparative Examples D-F except a portion of the cellulose ether has been replaced with microcrystalline cellulose (MICROCEL™ microcrystalline cellulose where 0.4% is retained by 250 micron mesh and 55.7% is retained by 74 micron mesh; MICROCEL is a trademark of Blanver Farmoquimica LTDA). The additive package for Examples 8, 9 and 10 contain 10 wt %, 20 wt % and 30 wt % of the microcrystalline cellulose, respectively.

Table 5 contains the formulations and workability characteristics for Comparative Examples D-F and Examples 8-10. Characterization is upon applying with a G-4 spray machine (PFT Typ G4 Plaster Machine Company PFT, Knauf PFT GmbH & Co) using a water feed rate of 325 liters per hour and hose pressure of 8-10 bar. Evaluations of workability are subjective evaluations with 100 serving as a reference value for a typical commercial material (Comp Ex D) and where higher values are better.

Comparing each of Examples 8-10 to Comp Ex D (to compare formulations with equal amounts of cellulose additive) reveals that adding MCC improves initial leveling and can improve initial stickiness. Initial lumpiness goes down presumably because of the very short mixing time with water does not allow for complete wetting of the MCC. Lumpiness tended to get better after 1 hour, which gave the MCC time to hydrate.

A comparison of Comp Ex E to Ex 8 and Comp Ex F to Ex 9 reveals that the improvement is not due, at least not entirely due, to a decrease in CE in the additive but rather the presence of the MCC. Ex 10 illustrates further improvements to initial leveling and stickiness by increasing the ratio of MCC in the cellulose additive.

TABLE 5

| | Comp Ex D | Comp Ex E | Comp Ex F | Ex 8 | Ex 9 | Ex 10 |
|---|---|---|---|---|---|---|
| Formulation (wt parts) | 100 gypsum 0.250 AP | 100 gypsum 0.225 AP | 100 gypsum 0.200 AP | 100 gypsum 0.225 AP | 100 gypsum 0.200 AP | 100 gypsum 0.175 AP |
| Additive Package ("AP") in wt % | | 97.7 CE 2.3 polyacrylamide ("PAA") | | 87.7 CE 10 MCC 2.3 PAA | 77.7 CE 20 MCC 2.3 PAA | 67.7 CE 30 MCC 2.3 PAA |
| Fresh Mortar Density (kilograms/liter | 1.393 | 1.397 | 1.416 | 1.407 | 1.415 | 1.421 |
| Slump after 5 minutes (millimeters) | 163 | 164 | 160 | 166 | 161 | 159 |
| Immediate Workability | | | | | | |
| Leveling | 100 | 100 | 105 | 105 | 105 | 110 |
| Stickiness | 100 | 100 | 95 | 100 | 100 | 105 |
| Lumps | 100 | 95 | 90 | 90 | 90 | 85 |
| Reworking after 1 Hour | | | | | | |
| Stickiness | 100 | 100 | 95 | 100 | 105 | 95 |
| Lumps | 100 | 90 | 105 | 95 | 90 | 100 |

TABLE 5-continued

|  | Comp Ex D | Comp Ex E | Comp Ex F | Ex 8 | Ex 9 | Ex 10 |
|---|---|---|---|---|---|---|
| Felting | 100 | 95 | 95 | 100 | 100 | 95 |
| Smoothen | 100 | 100 | 95 | 90-100 | 90-95 | 90 |

The invention claimed is:

1. A water-based inorganic binder composition comprising inorganic binder, cellulose ether and microcrystalline cellulose cellulose wherein the microcrystalline cellulose is present at a concentration of 10-30 percent by weight based on the total weight of cellulose ether and microcrystalline cellulose, and, further wherein the inorganic binder composition is in a form of a dry powder.

2. The composition of claim 1, wherein the inorganic binder is selected from a group consisting of gypsum-based mortar and cement.

3. The composition of claim 1, wherein the inorganic binder is gypsum-based mortar.

4. The composition of claim 1, wherein the inorganic binder is cement.

5. The composition of claim 1, wherein the combined concentration of cellulose ether and microcrystalline cellulose is in a range of 0.01 to 1.0 weight-percent based on total dry weight of the water-based inorganic binder composition.

6. The composition of claim 1, wherein the microcrystalline cellulose is free of agglomerated additive materials.

* * * * *